Aug. 26, 1969 R. F. MOORE 3,463,564

BEARING ASSEMBLY

Filed Nov. 17, 1967

INVENTOR
RICHARD F. MOORE
BY:
JOHN P. CHANDLER
HIS ATTORNEY.

3,463,564
BEARING ASSEMBLY
Richard F. Moore, Norwalk, Conn., assignor to Norma-Hoffmann Bearings Company, a division of Universal American Corporation, Stamford, Conn.
Filed Nov. 17, 1967, Ser. No. 683,904
Int. Cl. F16c 17/06, 17/08, 19/10
U.S. Cl. 308—230                                            5 Claims

ABSTRACT OF THE DISCLOSURE

Antifriction bearing unit comprising a cylindrical shell, open at one end and having a circular array of balls confined by the walls of the shell and having a single center ball engaging the circular array holding them against said wall, and projecting through the open end to be engaged by the end of a shaft having a V-shaped recess, the center ball being urged into driving relation with the shaft by a spring between the closed end and a plate supporting the circular array of balls.

---

This invention relates to an antifriction bearing of unique design and mounting which is employed in applications requiring the support of axial, radial and rotational forces. It is unique in that it relies on friction to transmit torque and its internal arrangement is such that its components provide an economic advantage over existing ball and roller bearing designs.

The principal object of the invention is to provide a low cost bearing which can be used in many installations where more expensive ball and roller bearings were previously used. Another object of the invention is to provide a simplified bearing which compensates for misalignment which may be present between housing bore and shaft. The bearing of the present invention is also characterized by its ease of manufacture in that it requires no raceway grinding or intricate measurements in the assembly of its components and no special shaft finish or hardening is required.

To this end the bearing assembly consists of a cylindrical shell with an open end and a closed end, a circular array of balls being positioned against a plate at the latter end with a spring, preferably a wavy sheet metal spring, between the plate and the closed end. The balls engage the annular wall of the shell which limits their outward movement radially. One large ball is nested in the center of the circular array of balls and keeps them in this outward position. The other side of the ball projects through the open end wall.

Optimum results depend upon the correct size relation between balls and the shell bore whereby minimum ball skidding is developed and the unit functions as a bearing wherein the center ball, the outer row of balls rotate at different speeds. The stresses between the balls, shell and plate are controlled by a spring which is deflected a predetermined amount.

The principal use of the bearing is in rotating devices using shafts, the latter having a V-shaped end recess which receives the center ball which usually rotates at the same speed as the shaft. Rolling contact is made with the circular row of balls, the plate and the shell.

Figure 1:
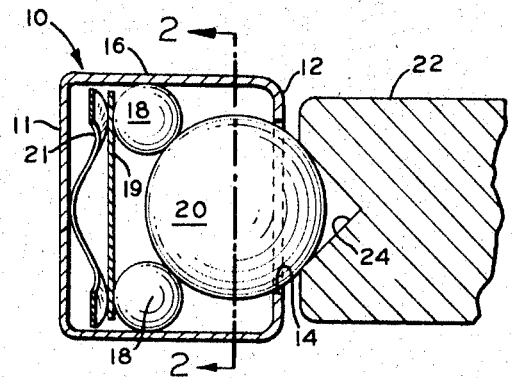
FIG. 1 is a sectional view of a typical design of the present invention.
Figure 2:
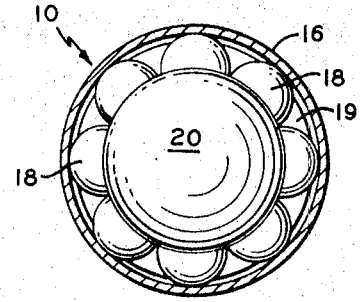
FIG. 2 is an end view taken on line A—A of FIG. 1.

The bearing shown in FIGS. 1 and 2 includes a generally cylindrical, relatively thin metal shell or cup 10 having a rear wall 11, a front wall 12 with a central opening 14, and an annular side wall 16. The cup is generally known in the art as a drawn cup. A circular row of balls 18 of medium size are supported on one side by a flat circular plate 19 and are engaged on the other side by a somewhat larger ball 20, a portion of which projects through opening 14. In FIG. 2, there is shown a full complement of balls so that they touch each other. The annular side wall limits outward movement of the balls.

On the opposite side of plate 19 a wavy spring 21 of sheet metal or group of such springs, are placed between end wall 11 and plate 19. Shaft 22 may be the shaft of a motor or other apparatus and has at its end a conical shaped V-recess 24 whose outer end is of a diameter somewhat less than the diameter of the ball and engages the ball in driving relation. In other words, driving power from the shaft is transmitted to the bearing unit through the friction developed between ball 20 and the shaft. The amount of force necessary to support shaft 22 can be regulated by substituting springs having varying resistance to compression. Ball 20 is, of course, retained in the shell because the diameter of opening 14 is less than the ball diameter. When springs 21 are compressed, there is a slight clearance between ball 20 and opening 14 and ring, the ball is precisely centered with respect to the opening and the ball is able to rotate freely.

Figure 3:
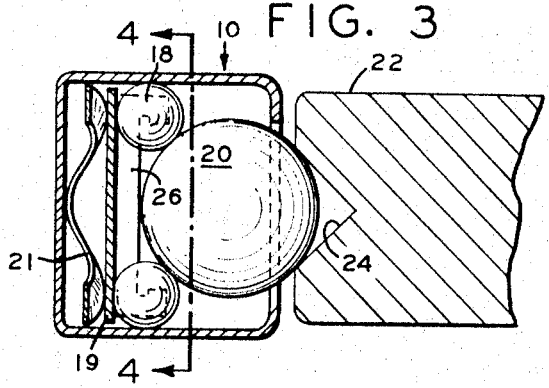
FIG. 3 is a sectional view showing a design incorporating a retainer.
Figure 4:
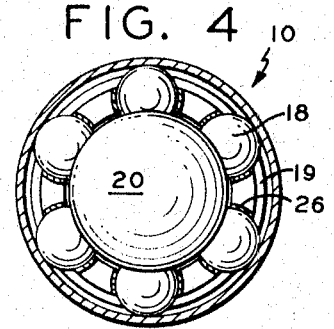
FIG. 4 is an end view taken along line B—B of FIG. 3.

In the second form of the invention shown in FIGS. 3 and 4, the shell, the plate and the large ball are the same but the smaller balls 18' are separated by a retainer 26, the purpose of which is to provide higher operating speeds for the unit by reducing the rubbing velocities which are present with ball-to-ball contact of FIG. 1. The retainer 26 rotates with the balls and it will, therefore, be apparent that the rubbing velocity is less than the rubbing velocity in the case of ball-to-ball contact which is in opposite direction.

Figure 5:
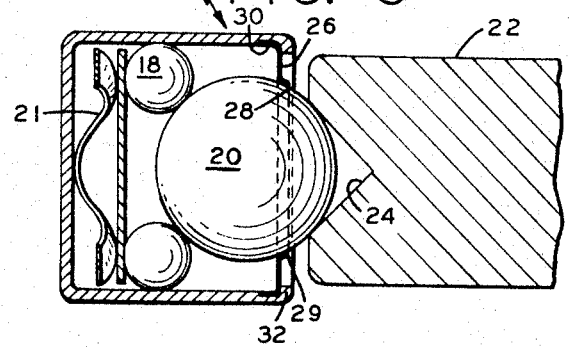
FIG. 5 is a sectional view showing a contacting seal.

The third form of the invention shown in FIG. 5 incorporates a seal 26 of resilient material which has a central opening 28 of lesser diameter than the ball and since the material out of which the seal is formed is quite pliable, the ball being urged outwardly by spring 21 and forms ring 29 which is diagonal in cross-section. It also has an outer ring-like section 30 which is retained in the cup by a narrow annular flange 32 of less width than annular end wall 12 of FIG. 1.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

The embodiments of the invention in which an exclusive property or privilege is claimed are defined as follows.

I claim:

1. A bearing device comprising a plurality of smaller balls arranged in circular array, a cylindrical shell of relatively thin metal and whose inner periphery is engaged by the balls and provided with a first end wall, a circular plate against which the balls on one side thereof are seated, resilient means between said plate and said end wall, a second end wall with a central circular opening, and a single larger ball of lesser diameter than the shell and of greater diameter than said opening projecting partially through the opening on one side thereof, the edges of said circular opening limiting outward movement of the larger ball, the other side of the ball engaging said first balls in circular array, the portion of said larger ball outside the shell being arranged to be engaged in driving relation by a shaft provided with a V-shaped end wall recess engaging said ball, the circular plate being in floating relation at all times between the first end wall and the smaller balls.

2. The structure of claim 1 wherein the resilient means is a sheet metal spring of wavy contour.

3. The structure of claim 1 wherein a full complement of balls are included in the circular array.

4. The structure of claim 1 wherein a retainer is employed to separate the balls in the circular array.

5. The structure of claim 1 wherein a resilient seal confined within the shell by the inner face of the second end wall engages the larger ball, the seal having an opening through which said ball projects.

References Cited
UNITED STATES PATENTS 1,357,562  11/1920  Hope _____ 308—233

FOREIGN PATENTS 547,050  8/1942  Great Britain.

MARTIN P. SCHWADRON, Primary Examiner

FRANK SUSKO, Assistant Examiner

U.S. Cl. X.R.

308—233